United States Patent [19]
Warren

[11] Patent Number: 6,116,222
[45] Date of Patent: Sep. 12, 2000

[54] TWO STROKE REGENERATIVE ENGINE

[76] Inventor: Edward Lawrence Warren, 3912 Snowy Egert Dr., West Melbourne, Fla. 32904

[21] Appl. No.: 09/354,670

[22] Filed: Jul. 16, 1999

[51] Int. Cl.[7] ........................................................ F02G 5/00
[52] U.S. Cl. ............................................................. 123/543
[58] Field of Search ..................................... 123/543, 546, 123/193.5, 193.3, 552, 550, 78 A; 60/517

[56] References Cited

U.S. PATENT DOCUMENTS

| | | |
|---|---|---|
| 1,186,350 | 6/1916 | Wagner . |
| 1,335,324 | 3/1920 | Gile . |
| 1,440,150 | 12/1922 | Hutchinson . |
| 4,280,488 | 7/1981 | Millman ................................. 123/546 |
| 4,284,055 | 8/1981 | Wakeman . |
| 4,630,447 | 12/1986 | Webber . |
| 4,790,284 | 12/1988 | Ferrenberg et al. ..................... 123/543 |
| 4,817,388 | 4/1989 | Bland . |
| 4,928,658 | 5/1990 | Ferrenberg et al. ..................... 123/543 |
| 5,465,702 | 11/1995 | Ferrenberg ............................... 123/543 |
| 5,540,191 | 7/1996 | Clark . |
| 5,632,255 | 5/1997 | Ferrenberg ............................... 123/543 |

*Primary Examiner*—Marguerite McMahon

[57] ABSTRACT

An improved two stroke, reciprocating, internal combustion engine, with multiple cylinders, each closed by a cylinder head and containing a power piston which is connected to a power output shaft. Each cylinder has means for the intake of working fluid and a cooler for the compressed air. It also contains a displacer that moves between the cylinder head and the power piston. This displacer contains one way flow valving, a means for the exhausting of the working fluid from the cylinder, a movable alternating flow heat exchanger used as a regenerator, a heat shield, and a means to bypass the regenerator. The linkage from the power output shaft to move the displacer contains a spring and damper arrangement that allows the compression and expansion ratios to be varied.

20 Claims, 16 Drawing Sheets

TWO STROKE REGENERATIVE ENGINE

BACKGROUND—FIELD OF INVENTION

The present invention relates to thermally regenerated, reciprocating, two stroke internal combustion engines that store the exhaust heat and return it to the engine cycle to do work.

BACKGROUND—DESCRIPTION OF PRIOR ART

Thermal regeneration is the capturing of waste heat from a thermodynamic cycle (or a heat engine operating on some thermodynamic cycle), and the utilization of that energy within the cycle or engine to improve the cycle or engine's performance. This is commonly done with many heat engines including Stirling engines, gas turbines, and Rankine cycle devices. In a gas turbine the exhaust heat coming out of the exhaust is transferred to the air leaving the compressor and going into the combustor. This way it is not necessary to add as much heat (fuel) in the combustor to raise the air temperature to the desired turbine inlet temperature. This means that the same work is accomplished but less fuel is used. The automobile and truck gas turbines use rotating regenerators to transfer energy from the exhaust gases to the compressed air.

The approach taken by most inventors who attempted to incorporate regeneration into reciprocating internal combustion engines was to try to regenerate existing designs. The three most successful designs are: the four cycle Otto cycle, the two stroke gasoline engine, and the so called twin cylinder engines where the air is compressed in one chamber, combusted in another, and expanded in a third. With the exception of Clark (1996, U.S. Pat. No. 5,540,191) all of the existing designs are four cycle designs with adaptation to two stroke engines such as Wakeman (1981, U.S. Pat. No. 4,284,055); Ferrenberg and Webber ( 1988, U.S. Pat. No. 4,790,284) and (1990, U.S. Pat. No. 4,928, 658); and Ferrenberg (1995, U.S. Pat. No. 5,465,702) and (1997, U.S. Pat. No. 5,632,255). The major drawback to all of the above two stroke designs is that they improve existing designs (crankcase compression or the use of external compression) instead of using the regenerator to aid in the intake and exhausting of air and products of combustion. With crankcase compression engines, no scavenging of the cylinder is possible, the volumetric efficiency is low (30 to 50 percent), and the engine is limited to operation at low piston speed (usually less than 1,000 fpm) for economical operation. Other differences exist between the engines and the regenerated engine disclosed herein. All of these are discussed in greater detail in the section entitled "Detailed Description of the Invention".

SUMMARY

This invention is a two stroke, internal combustion, reciprocating, regenerated engine made up of a number of similar working units. Each working unit is comprised of a cylinder that is closed at one end by a cylinder head and contains a movable power piston that is connected to a power output shaft. Means are provided (a displacer) to suck in the working fluid and push the exhaust out of the cylinder. This displacer can move between the power piston and the cylinder head, and means are provided to accomplish this movement at the appropriate times during the engine's operating cycle. The displacer is a movable wall that has attached to it displacer valves that open to allow air to flow through the movable wall while the displacer is moving away from the piston, and close to form a suction plunger while the displacer is moving towards the piston. The displacer also has attached to it an exhaust pipe, an exhaust valve that opens while the displacer is moving towards the power piston, and an alternating flow heat exchanger, called a regenerator. The movement of the displacer with its regenerator is such that the regenerative exhaust cooling stroke (the regenerator is heating) begins when the power piston is at about 85% of the expansion stroke, and ends when the power piston is about 15% of the way towards the cylinder head. The compressed air heating stroke (the regenerator is giving up heat) begins about 85% toward top dead center (315°) of the power piston's compression stroke, and ends at about 15% of downward travel (45°) of the power piston's expansion stroke. Means are provided for the introduction of fuel into the cylinder during this regenerative heating stroke. The engine can be operated with almost complete expansion of the air-fuel charge, or it can be operated in a high power output mode, depending on the motion control valve. In two embodiments of this invention the engine operates without the regenerator.

OBJECTS AND ADVANTAGES

Several objects and advantages of the regenerative engine are:

(a) The engine compresses the air in the same cylinder that the engine expands the air in.

(b) The engine compresses the air in a portion of the cylinder that is not heated by the hot gases.

(c) The engine allows the compressed air to be cooled.

(d) The engine saves the heat from the exhaust gases and releases the heat to the compressed air.

(e) All of the engines valves operate at compressor exit temperature or slightly higher.

(f) The engine exhausts most of the exhaust gases each stroke.

(g) The engine can be operated so that the charge is almost fully expanded.

(h) Working fluid bypasses the regenerator at high operating speeds.

DRAWING FIGURES

FIG. 1 depicts the engine at the start of the inlet and exhaust part of the cycle.

FIG. 2 shows the engine at the end of the "maximum power" inlet and exhaust part of the cycle.

FIG. 3 shows the engine at the end of the "maximum expansion" inlet and exhaust part of the cycle, or operating on a two stroke cycle using compressed air.

FIG. 4 shows the engine at the start of the expansion part of the cycle.

FIG. 5 shows the engine at the end of a movable regenerator 10 heating stroke.

FIG. 6a shows the displacer on its exhaust cooling stroke.

FIG. 6b shows the displacer on its compressed air heating stroke.

FIG. 7a shows the motion control shaft 38 at the end of a movable regenerator 10 heating stroke.

FIG: 7b shows the motion control shaft 38 at the start of a movable regenerator 10 cooling, intake, and exhaust stroke.

Figures 7A, 7B, 7C, 7D:
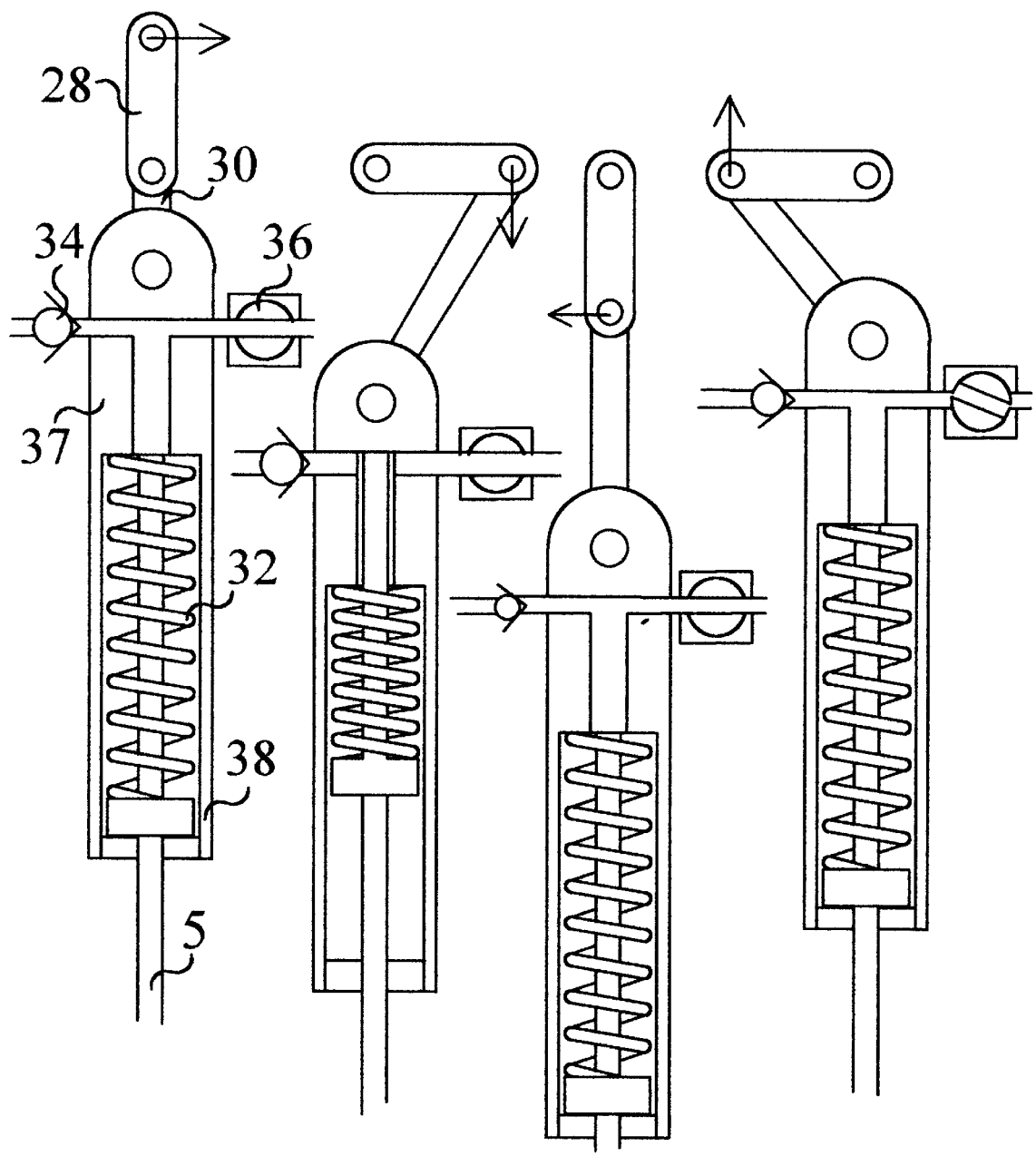
FIGS. 7a–7d show the details of the motion control shaft 38 (with motion control valve 36).

FIG. 7c shows the motion control shaft 38 at the end of a movable regenerator 10 cooling, intake, and exhaust stroke with the motion control valve set for "maximum power".

FIG. 7d shows the motion control shaft 38 at the end of a movable regenerator 10 cooling, intake, and exhaust stroke with the motion control valve set for "maximum expansion".

FIGS. 8a–8d show a first alternative embodiment of the invention.

FIGS. 9a–9d show a second alternative embodiment of the invention.

Figure 10:
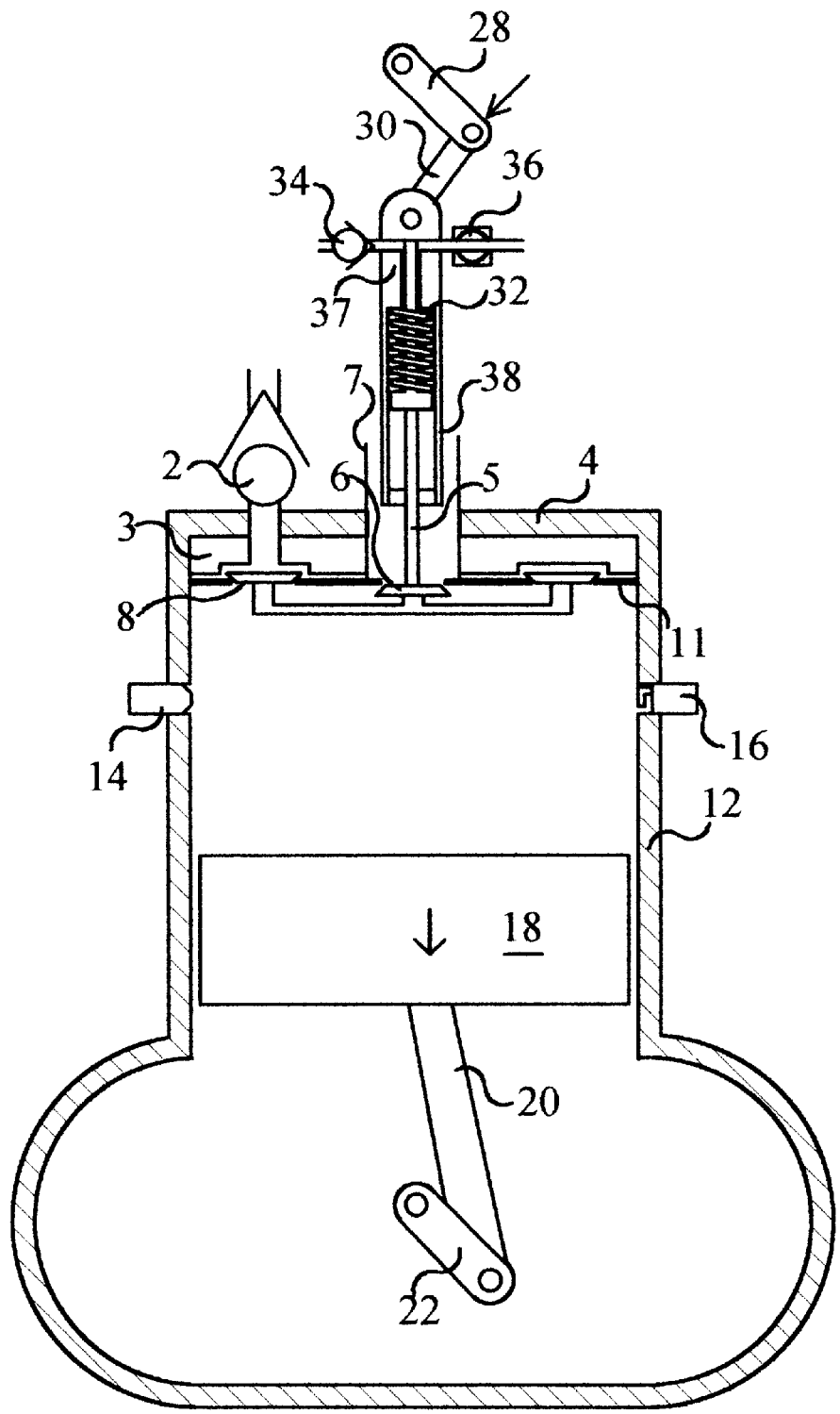

FIG. 10 shows a third alternative embodiment of the invention. It depicts the engine at the start of an inlet and exhaust part of the cycle.

Figure 11:
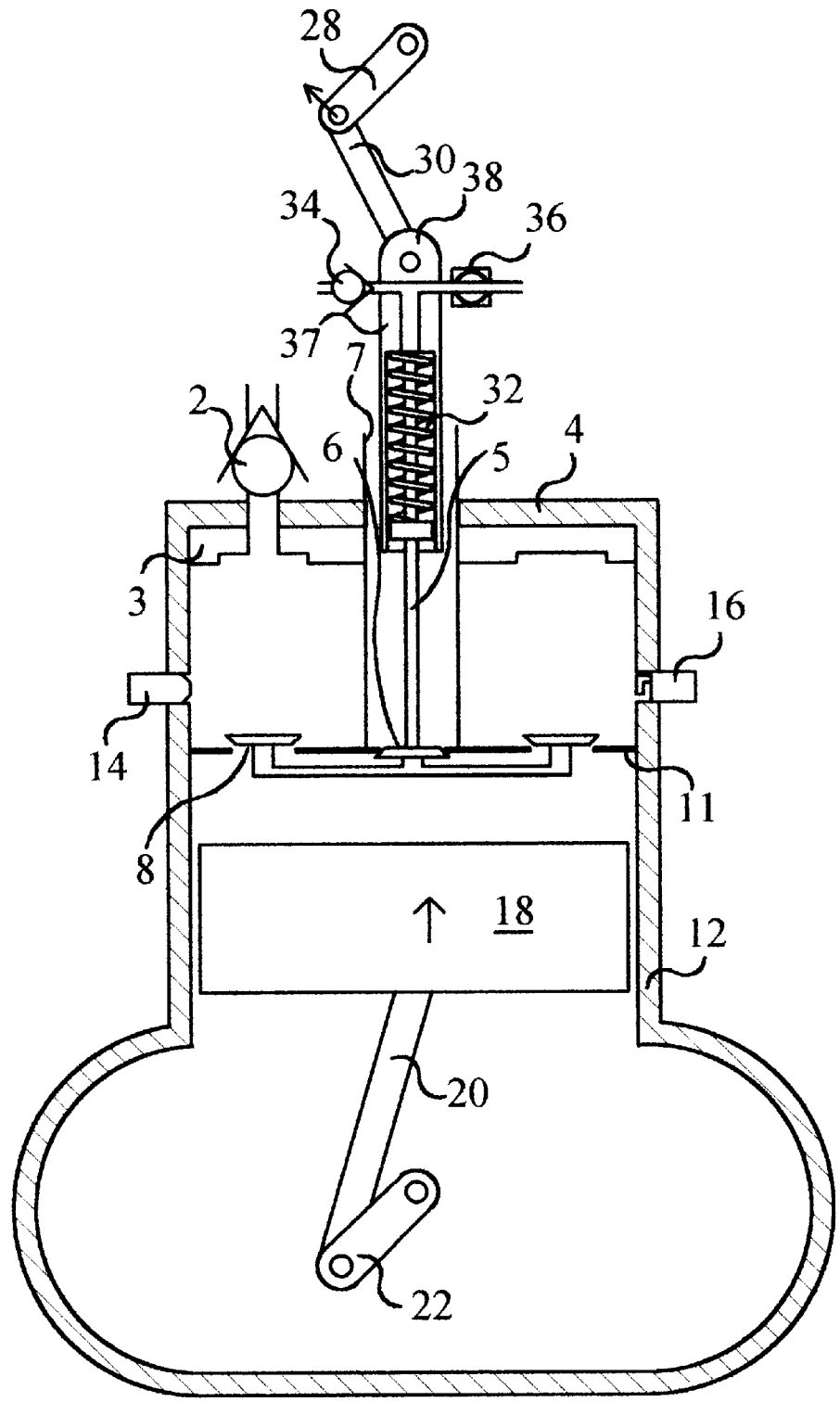

FIG. 11 shows the engine of FIG. 10 at the end of the "maximum power" inlet and exhaust part of the cycle.

Figure 12:
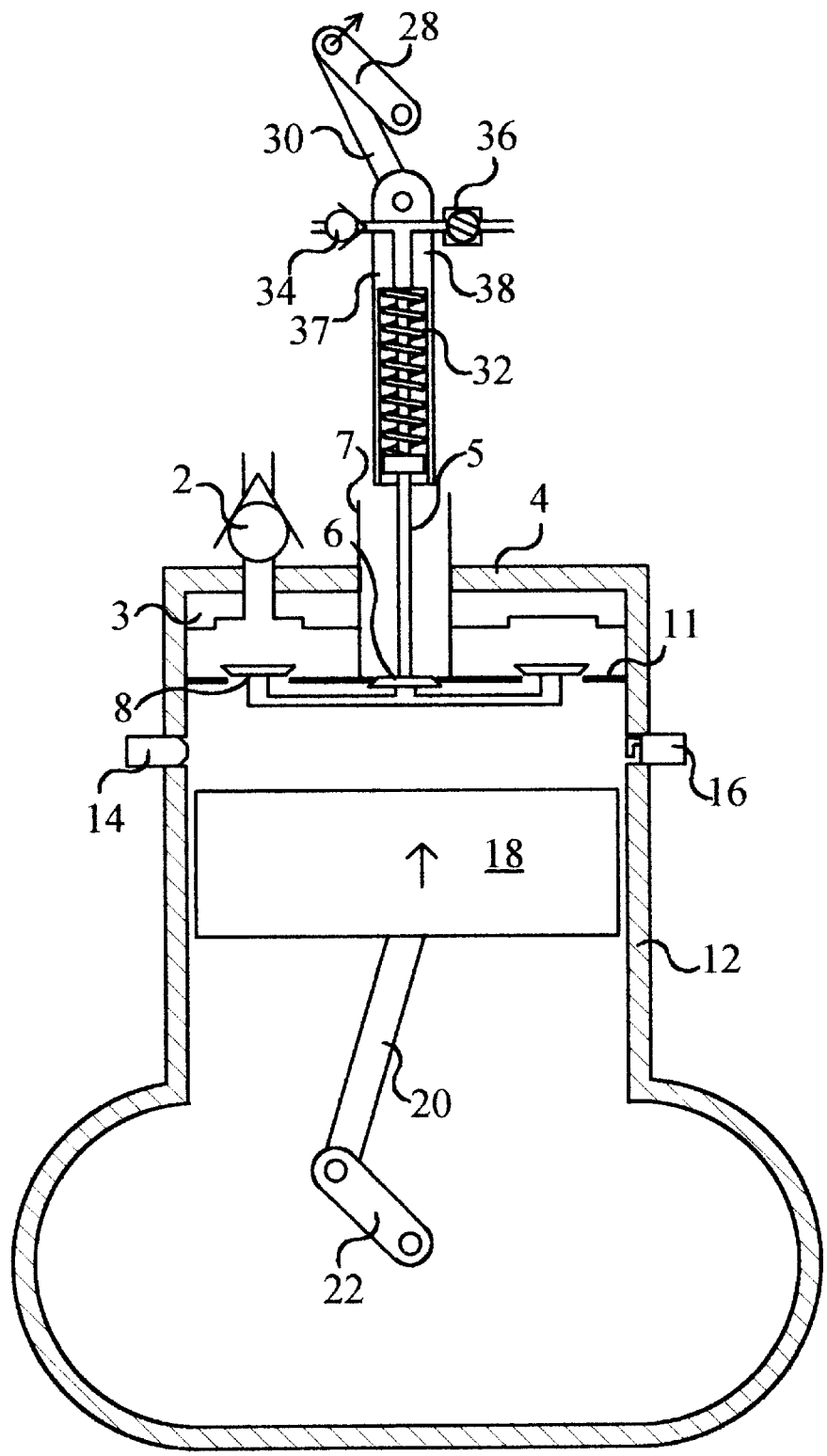

FIG. 12 shows the engine of FIG. 10 at the end of the "maximum expansion" inlet and exhaust part of the cycle.

Figure 13:
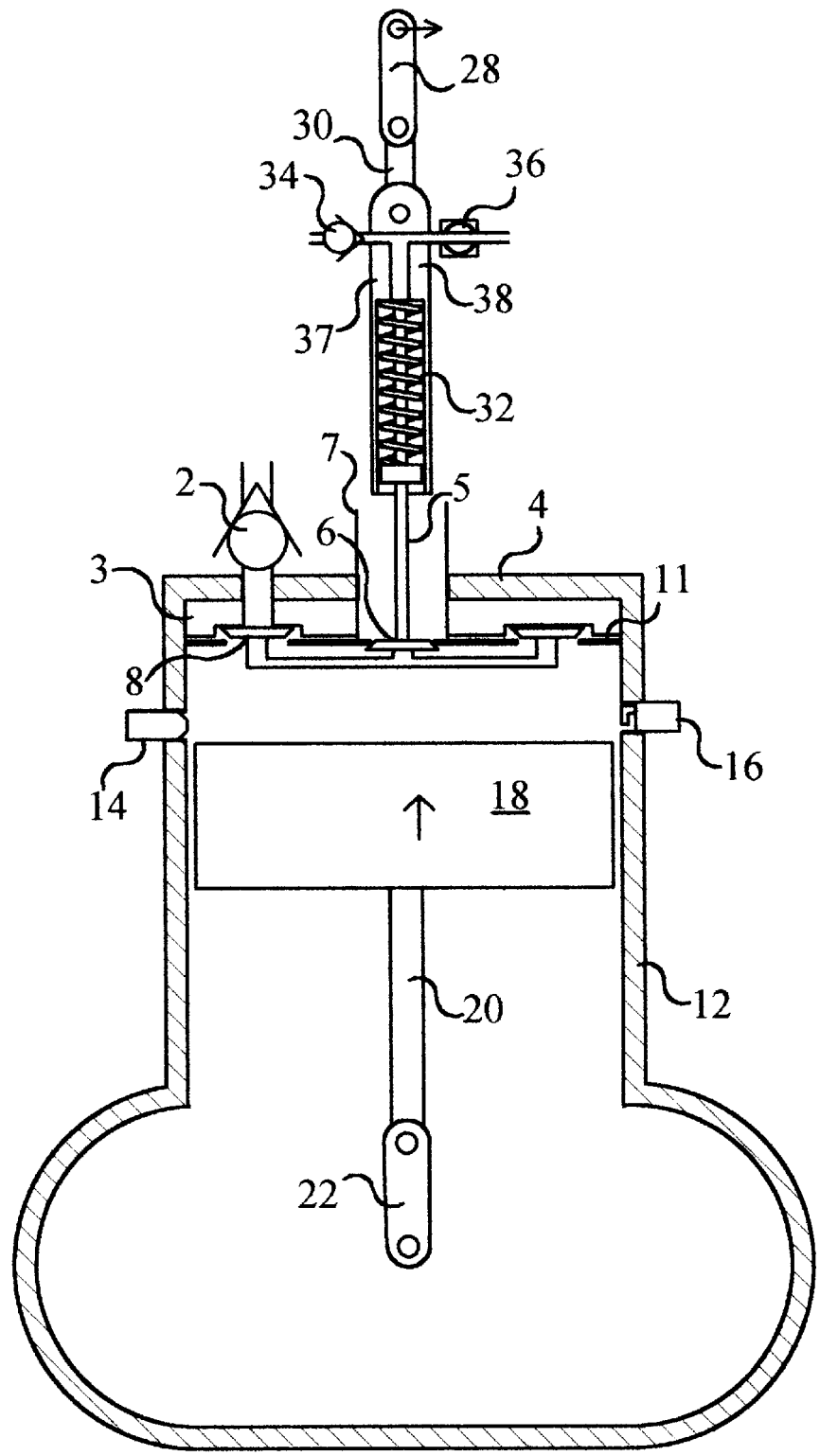

FIG. 13 shows the engine of FIG. 10 at the start of the expansion part of the cycle.

Figure 14:
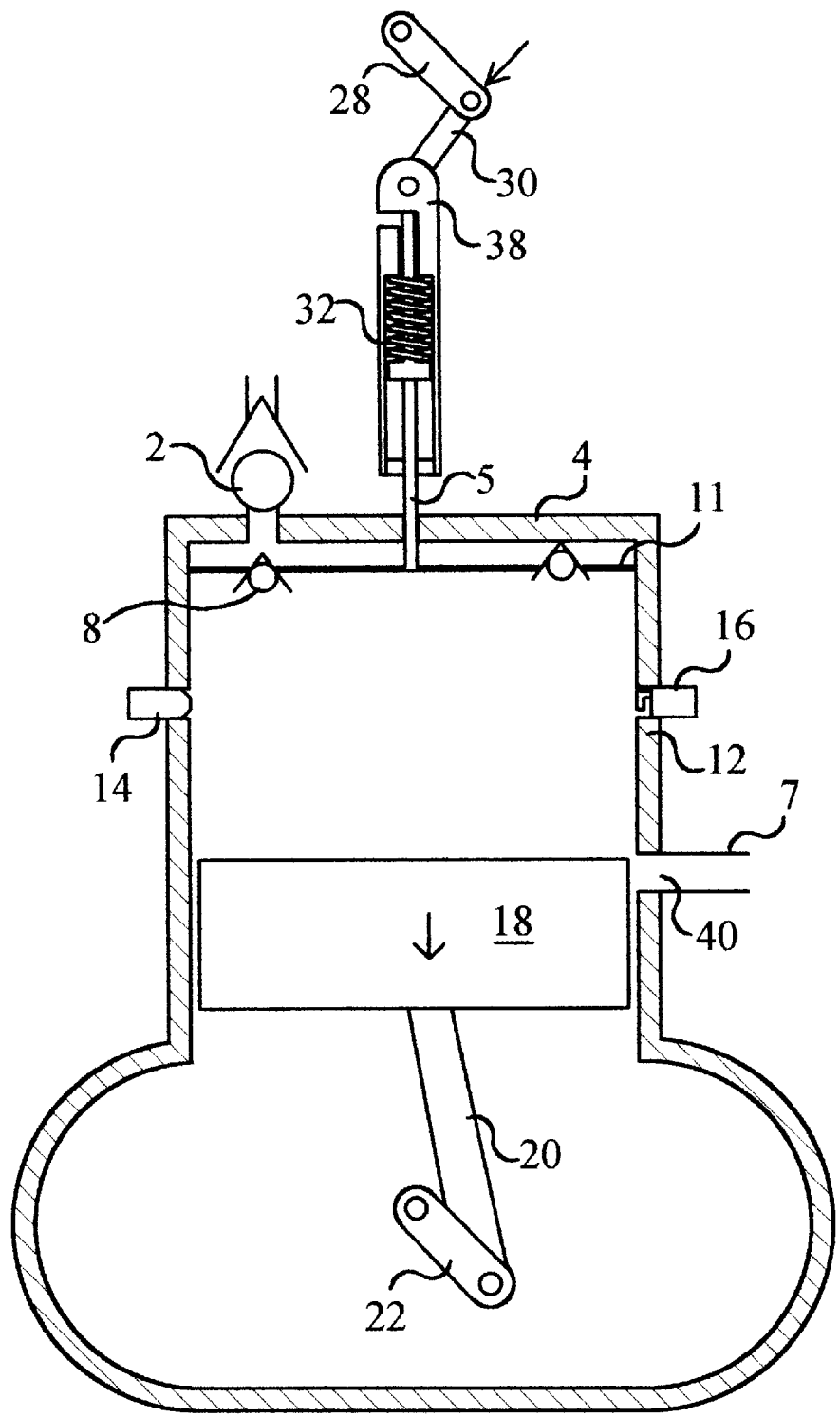

FIG. 14 shows a fourth alternative embodiment the invention. It depicts the engine at the start of an inlet and exhaust part of the cycle.

Figure 15:
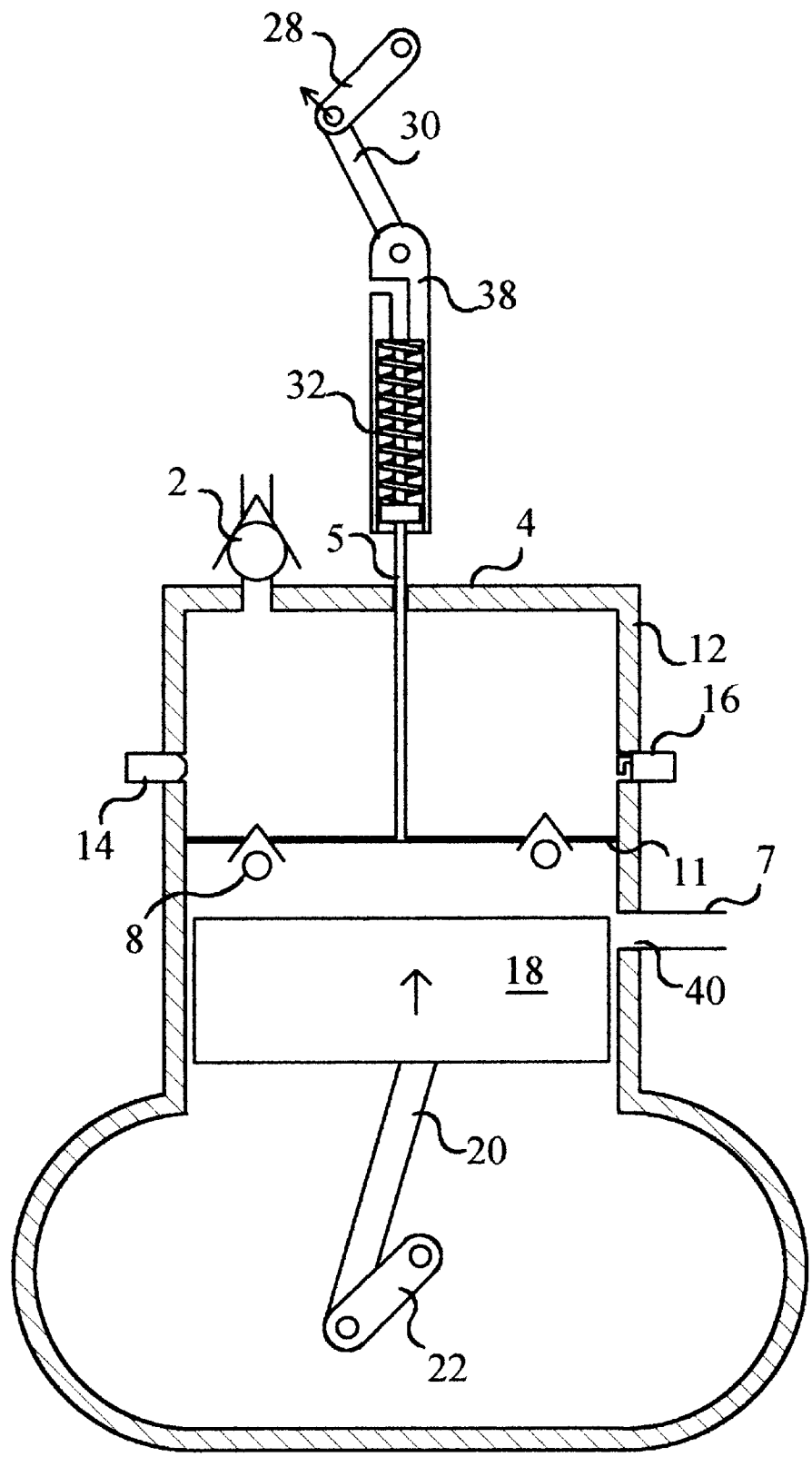

FIG. 15 shows the engine of FIG. 14 at the end of the inlet and exhaust part of the cycle.

Figure 16:
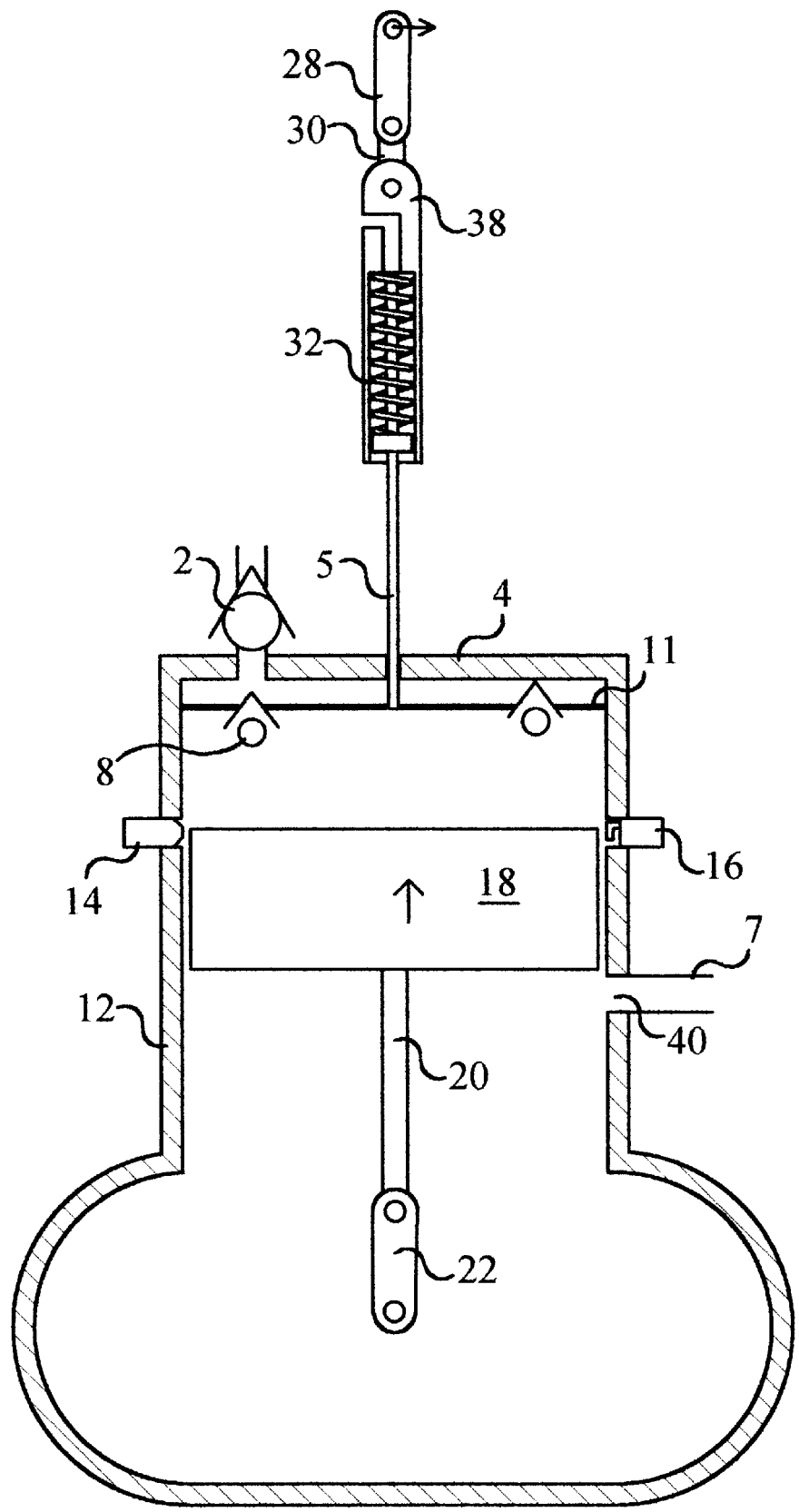

FIG. 16 shows the engine of FIG. 14 at the end of the compression part of the cycle.

Reference Numerals in Drawings

| | | | |
|---|---|---|---|
| 2 | air inlet valve | 18 | power piston |
| 3 | cooler | 20 | connecting rod |
| 4 | cylinder head | 22 | power output shaft |
| 5 | actuator | 26 | thermal shield |
| 6 | exhaust valve | 28 | upper crankshaft |
| 7 | exhaust pipe | 30 | upper connecting rod |
| 8 | displacer valve | 32 | spring |
| 9 | regenerator bypass valve | 34 | check valve |
| 10 | movable regenerator | 36 | motion control valve |
| 11 | displacer | 37 | pneumatic cylinder |
| 12 | cylinder | 38 | motion control shaft |
| 14 | fuel injector | 40 | exhaust port |
| 16 | igniter | 42 | fixed orifice |

DESCRIPTION

FIGS. 1 to 7—Preferred Embodiment

This invention is a two stroke regenerative, reciprocating, internal combustion engine employing a displacer 11 housing a movable regenerator 10 as described herein. The preferred embodiment of this invention employs a two stroke cycle divided into three parts. The first part is the intake and the exhaust part. The second is the compression part, and the third is the expansion part. The expansion part is from about top dead center to about 85% of the downward travel of power piston 18 (or as measured by power output shaft 22 rotation from top dead center to about 135 degrees). The intake and exhaust part is from about 85% of the downward travel of power piston 18 (135°) to about 15% of the travel back up (225°) for "maximum power" operation, and to about 50% of the travel back up (270°) for "maximum expansion" operation. The compression part is from about 15% of the travel back up of power piston 18 (225°) for "maximum power" operation, and from about 50% of the travel back up of power piston 18 (270°) for "maximum expansion" operation to about top dead center. The above positions are all estimates and are given for descriptive purposes only. The actual position a part of the cycle may begin or end at, may be different from those set out above.

In the preferred embodiment of this invention displacer 11 makes two strokes each cycle, a stroke towards power piston 18, which is the air intake, exhaust, and regenerative cooling stroke (exhaust gases cool); and a stroke away from power piston 18 which is the regenerative heating stroke (working fluid heats).

The regenerative cooling stroke begins with the displacer adjacent to the cylinder head 4 and ends with the displacer 11 adjacent to power piston 18. During the regenerative cooling stroke displacer 11 moves down (towards power piston 18) forcing the hot exhaust gases through movable regenerator 10, and movable regenerator 10 absorbs heat from the exhaust gases (cooling the exhaust gases). As displacer 11 is making the regenerative cooling stroke it is also forcing out exhaust gases and sucking in fresh air.

The regenerative heating stroke starts with displacer 11 close to and moving up with power piston 18 and ends with the displacer 11 adjacent to cylinder head 4. During the regenerative heating stroke movable regenerator 10 is moved up through the working fluid trapped between power piston 18 and cylinder head 4 and transfers heat to this working fluid (heating the working fluid). The working fluid that is expected to be employed in this invention is air. However, this working fluid could be any mixture of gases, liquids, and solids that can undergo an exothermic chemical reaction with the fuel. The working fluid that is introduced into the cylinder is sometimes referred to as fresh working fluid, or as the charge. The fresh working fluid can contain some residual reaction products that are trapped in the cylinder after the exhaust means close, or that are added to it in the intake manifold (i.e. exhaust gas recirculation). After the combustion (or other exothermic reaction which provides the power for the engine) the working fluid is referred to as spent working fluid, exhaust fluid, or exhaust gases. The fuel may be any solid, liquid, gas, or combinations of these that can undergo an exothermic reaction with the fresh working fluid.

When displacer 11 is not moving, it is adjacent to cylinder head 4. "adjacent to" means that displacer 11 is in contact with or as close as possible to cylinder head 4 given the mechanical and structural constraints associated with the coming together of rapidly moving objects. "Close to" is synonymous with "adjacent to". While it is advantageous to minimize some internal volumes that are not swept by displacer 11, it must be recognized that small clearance regions or volumes will probably be necessary to prevent damaging impacts between components and for clearances between moving components. Examples of such clearance regions or volumes include small gaps between displacer 11 and cylinder head 4 when displacer 11 is adjacent to it, the clearance gap between the periphery of displacer 11 and cylinder 12 wall, and other non-heated or partially heated volumes. There is internal volume between power piston 18 and displacer 11 as the two come together.

FIGS. 1–5 illustrate schematically an internal combustion engine suitable for practice of this invention. Only one set of components for such an engine is illustrated; however, what is illustrated will function as a complete engine if it has an inertial load. It will be understood that this is merely representative of one set of components. A plurality of such structures joined together would make up a larger engine. Other portions of the engine are conventional. Thus, the bearings, seals etc. of the engine are not specifically illustrated. The valves illustrated are but one type out of many that could be used. For example exhaust valve 6 could be a rotary disk valve, that when rotated counterclockwise opens and when rotated clockwise closes, displacer valves 8 could be on the same rotary disk that when rotated clockwise opens and when rotated counterclockwise closes, displacer valves 8 could be pressure actuated valves commonly called check valves. Exhaust valve 6 can be any valve that motion control shaft 38 can open when displacer 11 moves down and close when displacer 11 moves up. Displacer valves 8 close when displacer 11 moves down and open when displacer 11 moves up. Motion control shaft 38 is made up of several parts. These are shown in detail in FIGS. 7a–d.

The preferred embodiment of a two stroke regenerative engine can be operated with supercharging or without supercharging. Cylinder 12 is closed at one end by a cylinder head 4 that contains air inlet valve 2. When air inlet valve 2 is open it allows air to be sucked into the cylinder volume located between cylinder head 4 and displacer 11. Cylinder 12 further contains cooler 3; fuel injector 14; power piston 18 which is connected to power output shaft 22 by a connecting rod 20 (for converting the linear motion of the piston to the rotating motion of the shaft); and igniter 16. (All of the engine embodiments presented herein utilize a spark plug for ignition of the fuel. While recognizing that this igniter may only be required for starting, such an ignition source is included in every embodiment and claim.).

Air inlet valve 2 allows air to enter the engine. It can be any of a variety of valves including those referred to as check valves or one way valves. Cooler 3 cools the air as the air is being compressed. Cooling can be accomplished by using cooling coils lining cylinder head 4, or it can use any of a variety of off the shelf coolers. Fuel injector 14 can be an off the shelf injector that injects fuel into cylinder 12. Igniter 16 can be on off the shelf igniter that ignites the fuel, or it can be a catalytic burner. The expanding gases exert a force on power piston 18, (a cylindrical piston that can move up and down in cylinder 12). That force, exerted on power piston 18 moving it down, is transmitted via connecting rod 20 and power output shaft 22 to a load (not shown). Cylindrically shaped displacer 11 houses cylindrically shaped movable regenerator 10, exhaust valve 6, displacer valves 8, thermal shield 26, and exhaust pipe 7; and is shown larger in FIGS. 6a and 6b. Exhaust valve 6 allows the exhaust gases to leave the engine. Exhaust pipe 7 ducts the exhaust gases away from the engine.

Figure 6A:
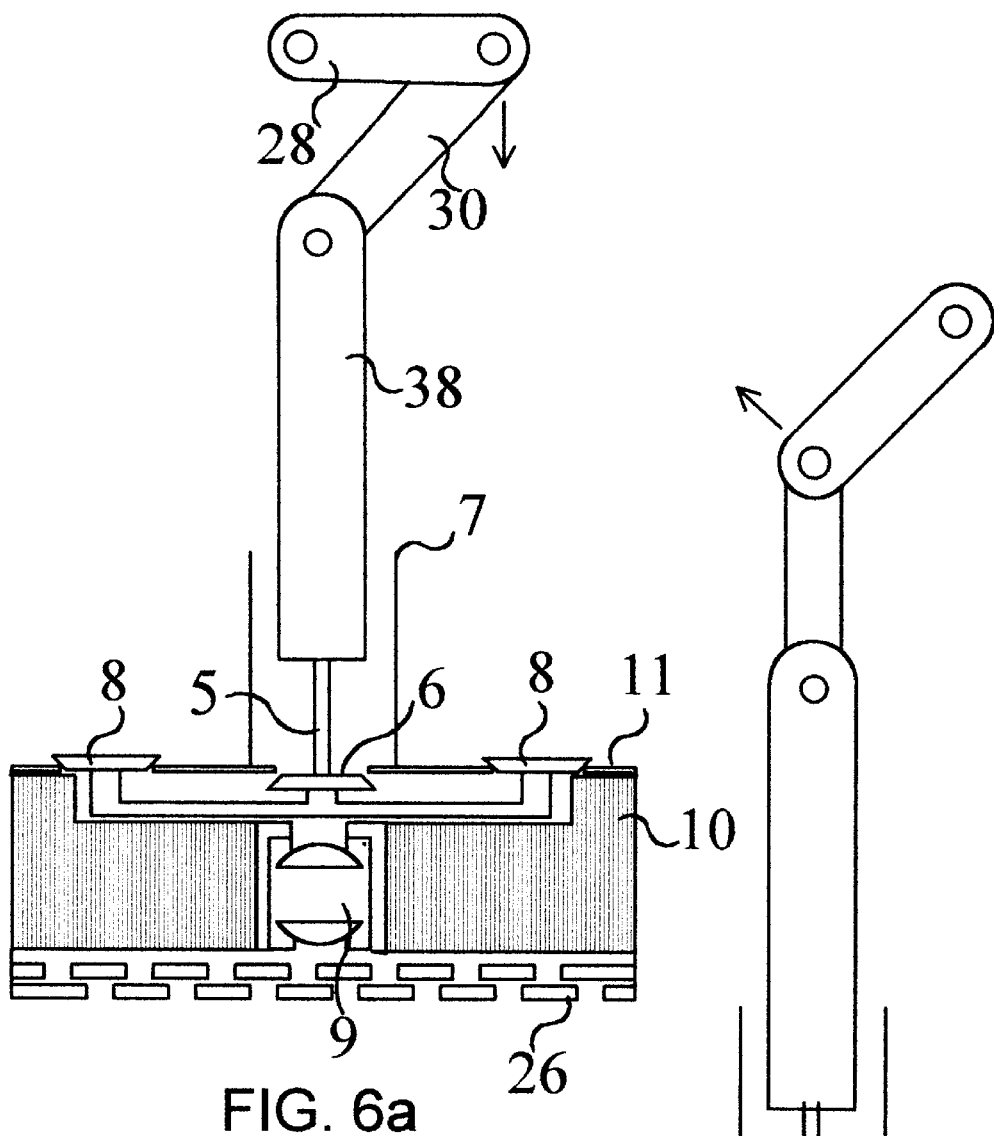
FIGS. 6a–6b show the details of the displacer of the engine.
Figure 6B:
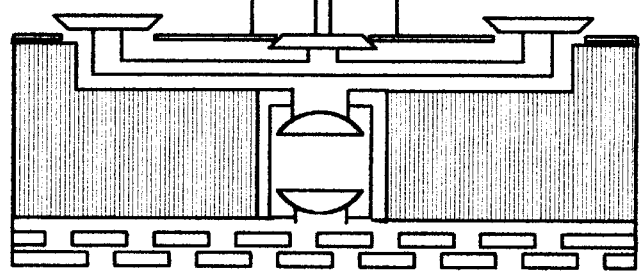

Displacer 11 moves up and down in cylinder 12, and it displaces air or exhaust gases from the space that it moves into. When displacer 11 moves up displacer valves 8 open and allow air to move from the space between movable regenerator 10 and cylinder head 4 to the space below displacer 11 and above power piston 18. When displacer 11 is moving down displacer valves 8 are closed and do not allow any air to pass. Movable regenerator 10 is made from a permeable material such that when movable regenerator 10 moves down and the exhaust gases flow through it, the material absorbs heat from the exhaust gases. When movable regenerator 10 moves up, the permeable material gives up heat to the compressed air. FIGS. 6a and 6b show displacer 11 and everything attached to it. Actuator 5 opens and closes exhaust valve 6 and displacer valves 8. Actuator 5 also causes displacer 11 to move. Attached to displacer 11 is movable regenerator 10; thermal shield 26 (to protect the regenerator from some of the heat of combustion); exhaust pipe 7 (when exhaust valve 6 is open exhaust pipe 7 conducts the exhaust gases that flow through movable regenerator 10 to an exhaust manifold not shown); and regenerator bypass valve 9 that when open bypasses the working fluids and exhaust gases around movable regenerator 10; displacer 11 moves back and forth (down and up) between cylinder head 4 and power piston 18 parallel to the axis of the cylinder.

The means to move displacer 11 is actuator 5, a part of motion control shaft 38 (shown in detail in FIGS. 7a–d) which is driven by upper crankshaft 28 and upper connecting rod 30. Motion control shaft 38 contains pneumatic cylinder 37 (in which actuator 5 acts as a piston), spring 32, check valve 34, and motion control valve 36. Motion control shaft 38 moves displacer 11 by urging actuator 5. The size ratio between upper crankshaft 28 and power output shaft 22 and the angular displacement between upper crankshaft 28 and power output shaft 22 are approximate and must be determined for the detail design of each engine. Other means can be used to move actuator 5, such as a cam on power output shaft 22, a push rod, and a rocker arm (not shown). These other means can be applied to actuator 5 from above or below power piston 18. The means can be hydraulic, pneumatic, electrical, mechanical, or any combination of them that will move the actuator 5 when and as required. The means to actuate regenerator bypass valve 9 are not shown but they can be hydraulic, pneumatic, electrical, mechanical, or any combination of them. One such means would be a pressure operated valve that opens at high pressure.

FIG. 6a shows displacer 11 being moved down. The force from motion control shaft 38 is being exerted on actuator 5 such that exhaust valve 6 opens, displacer valves 8 close, and displacer 11 moves down.

FIG. 6b shows displacer 11 being moved up. The force from motion control shaft 38 is being exerted on actuator 5 such that exhaust valve 6 closes, displacer valves 8 open, and displacer 11 moves up.

FIGS. 7a–d show the motion control shaft 38. Motion control shaft 38 contains spring 32, check valve 34, motion control valve 36, and pneumatic cylinder 37 (in which actuator 5 acts as a piston). Spring 32 allows actuator 5 to allow displacer 11 to remain at the top of cylinder 12 until actuator 5 reaches the top of pneumatic cylinder 37, or until the charge in cylinder 12 is fully expanded. Check valve 34 allows air to exit, but not to enter pneumatic cylinder 37. A vacuum is created in pneumatic cylinder 37 above actuator 5 as spring 32 tries to move actuator 5 down. Motion control valve 36 regulates the amount of air that can enter (it also permits air to leave) pneumatic cylinder 37, hence the speed at which actuator 5 reaches the bottom of pneumatic cylinder 37. Motion control valve 36 can be a variable orifice valve. Motion control valve 36 can be controlled by speed, acceleration, cylinder 12 temperature, or cylinder 12 pressure, or manual setting. The functions of check valve 34 and motion control valve 36 can be combined into one unit, but they are shown as separate for clarity.

FIG. 7a shows the condition of motion control shaft 38 at the end of the regenerative heating stroke.

FIG. 7b shows the condition of motion control shaft 38 at the end of the expansion part of the cycle.

FIG. 7c shows the condition of motion control shaft 38 at the end of the air intake, and exhaust, part of the cycle when the engine is operating at "maximum power".

FIG. 7d shows the condition of motion control shaft 38 at the end of the air intake, and exhaust, part of the cycle when the engine is operating at "maximum expansion".

FIG. 8a–8d—First Alternative Embodiment

Figures 8A, 8B, 8C, 8D:
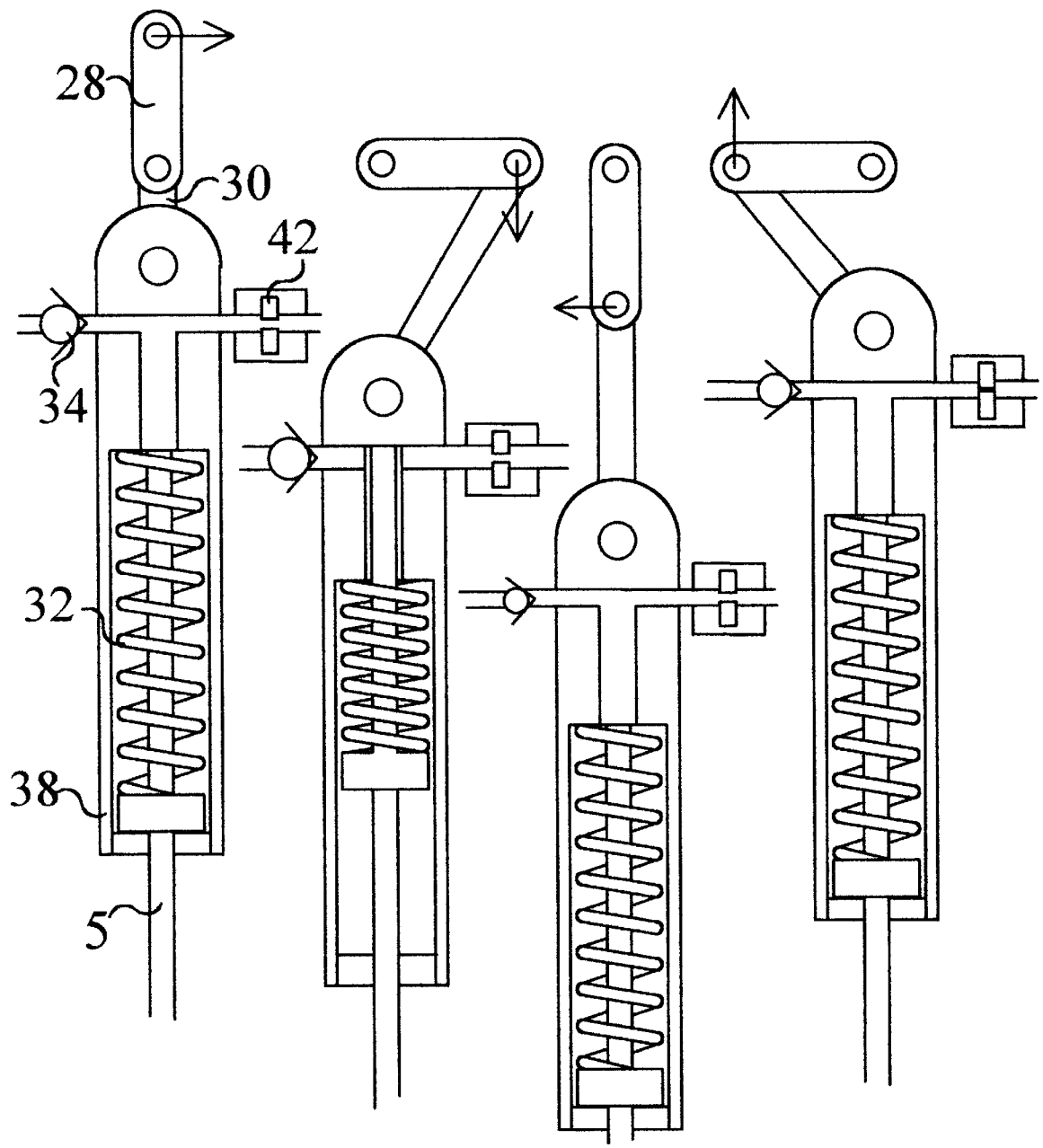

FIG. 8a shows the details of the motion control shaft 38 (with motion control valve 36 replaced with fixed orifice 42) at the end of a movable regenerator 10 heating stroke.

FIG. 8b shows the details of the motion control shaft 38 (with motion control valve 36 replaced with fixed orifice 42) at the start of a movable regenerator 10 cooling, intake, and exhaust stroke.

FIG. 8c shows the details of the motion control shaft 38 (with motion control valve 36 replaced with fixed orifice 42) at the end of a movable regenerator 10 cooling, intake, and exhaust stroke with fixed orifice 42 set for "maximum power".

FIG. 8d shows the details of the motion control shaft 38 (with motion control valve 36 replaced with fixed orifice 42) at the end of a movable regenerator 10 cooling, intake, and exhaust stroke with fixed orifice 42 set for "maximum expansion".

FIG. 9a–9d—Second Alternative Embodiment

Figures 9A, 9B, 9C, 9D:
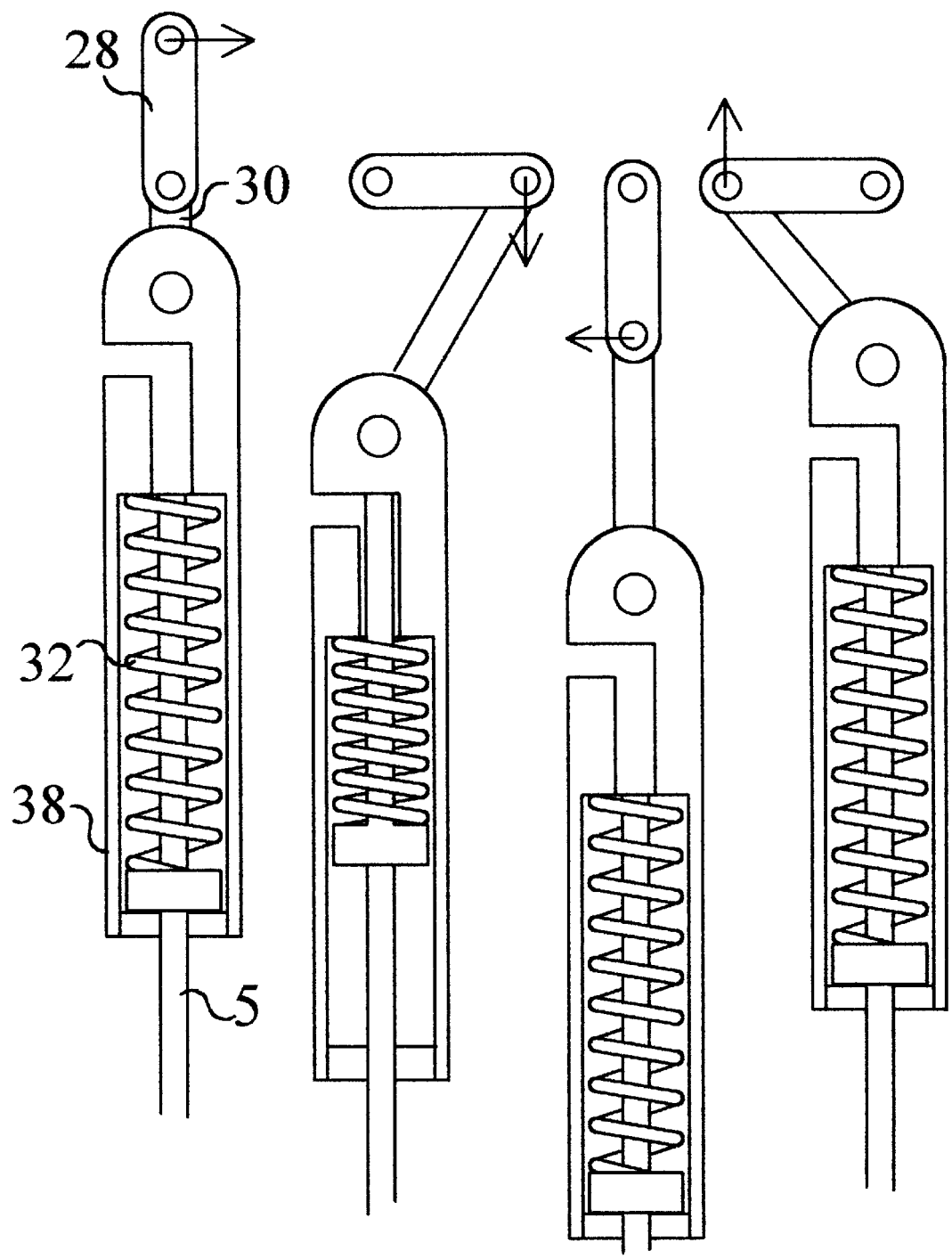

FIG. 9a shows the details of the motion control shaft 38 (using only the tuning of spring 32 to control the return rate of actuator 5) at the end of a movable regenerator 10 heating stroke.

FIG. 9b shows the details of the motion control shaft 38 (using only the tuning of spring 32 to control the return rate of actuator 5) at the start of a movable regenerator 10 cooling, intake, and exhaust stroke.

FIG. 9c shows the details of the motion control shaft 38 (using only the tuning of spring 32 to control the return rate of actuator 5) at the end of a movable regenerator 10 cooling, intake, and exhaust stroke with the tuning of spring 32 set for "maximum power".

FIG. 9d shows the details of the motion control shaft 38 (using only the tuning of spring 32 to control the return rate of actuator 5) at the end of a movable regenerator 10 cooling, intake, and exhaust stroke with the tuning of spring 32 set for "maximum expansion".

FIGS. 10–13 Third Alternative Embodiment

A third alternate embodiment of the engine is shown in FIGS. 10–13. It is the engine of FIGS. 1–5 without regenerator 10, thermal shield 26, and regenerator bypass valve 9.

FIG. 14–16 Fourth Alternative Embodiment

A fourth alternate embodiment of the engine is shown in FIGS. 14–16. It is the engine of FIGS. 1–5 without regenerator 10, thermal shield 26, regenerator bypass valve 9, exhaust valve 6, and cooler 3. Exhaust pipe 7 has been moved down to the side of cylinder 12 to receive the exhaust gases from exhaust port 40. Displacer valves 8 now have to be one way flow valves that allow flow through displacer 11 when displacer 11 is moving away from power piston 18.

FIGS. 1 to 5—Operation of Preferred Embodiment

FIGS. 1 to 5, present the sequence of steps or processes occurring in a two stroke regenerative engine. The air intake and exhaust part of the cycle takes place between FIGS. 1 and 2 for "maximum power" operation of the engine, and between FIGS. 1 and 3 for "maximum expansion of the charge" operation of the engine. The compression part of the cycle takes place between FIGS. 2 and 4 for "maximum power" operation, and between FIGS. 3 and 4 for "maximum expansion" operation. The expansion part of the cycle takes place between FIGS. 5 and 1.

Figure 1:
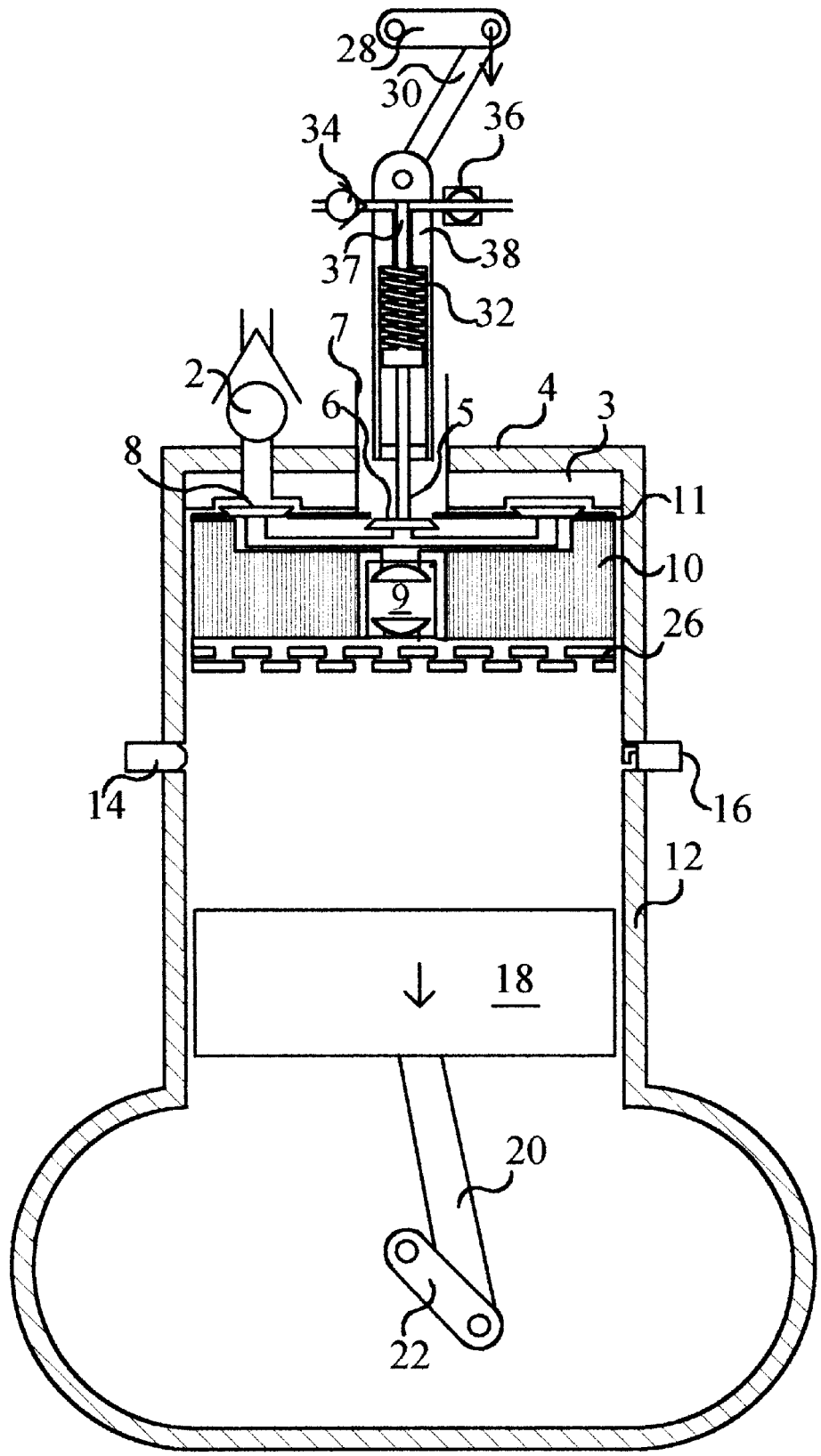
FIGS. 1–5 are schematic illustrations of the preferred embodiment of a two stroke regenerative engine with movable regenerator 10.

FIG. 1 shows power piston 18 at about 85% of downward travel (135°). The engine has completed its expansion part of the cycle and is about to start the intake and exhaust part.

Figure 2:
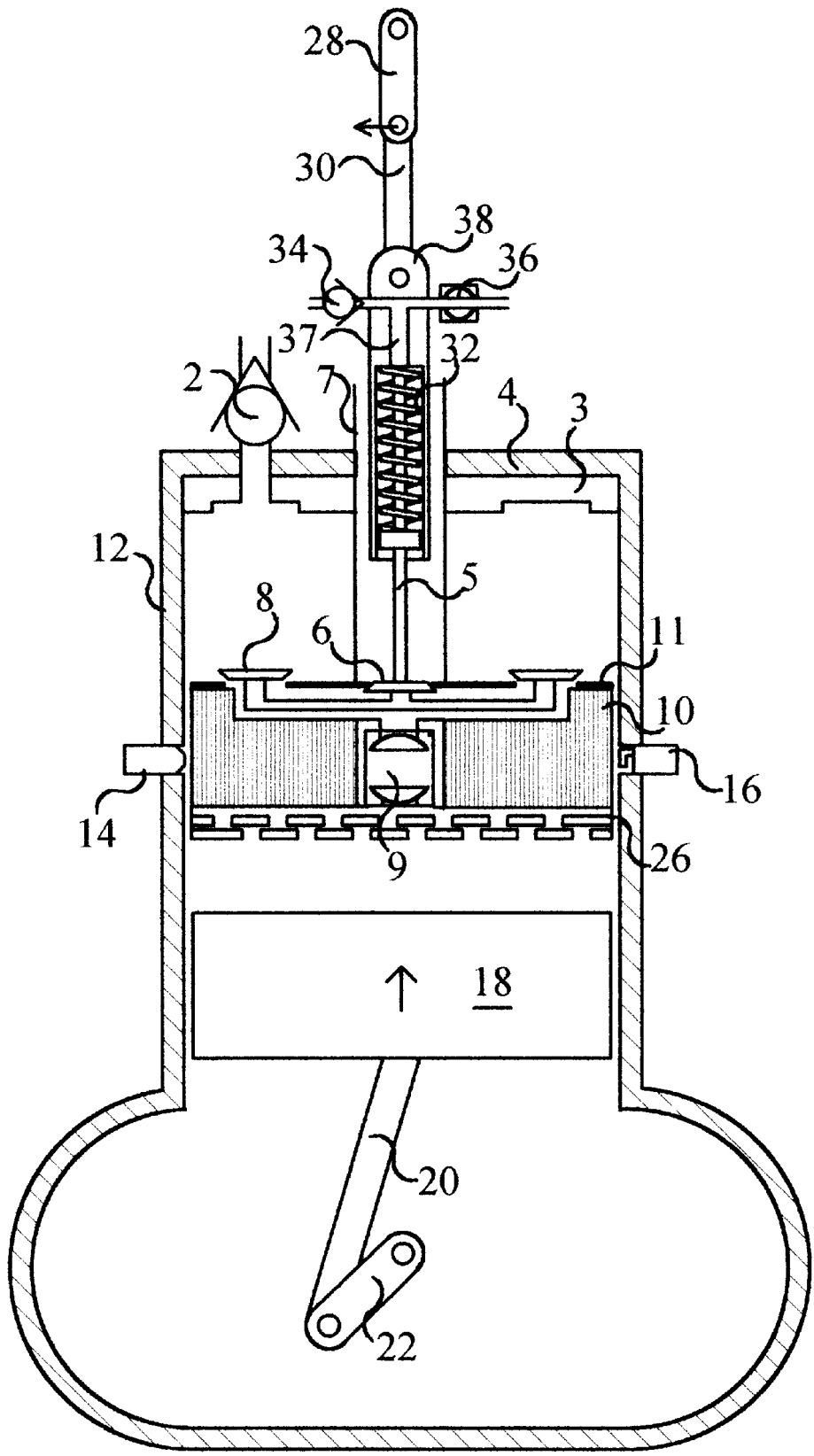
Figure 3:
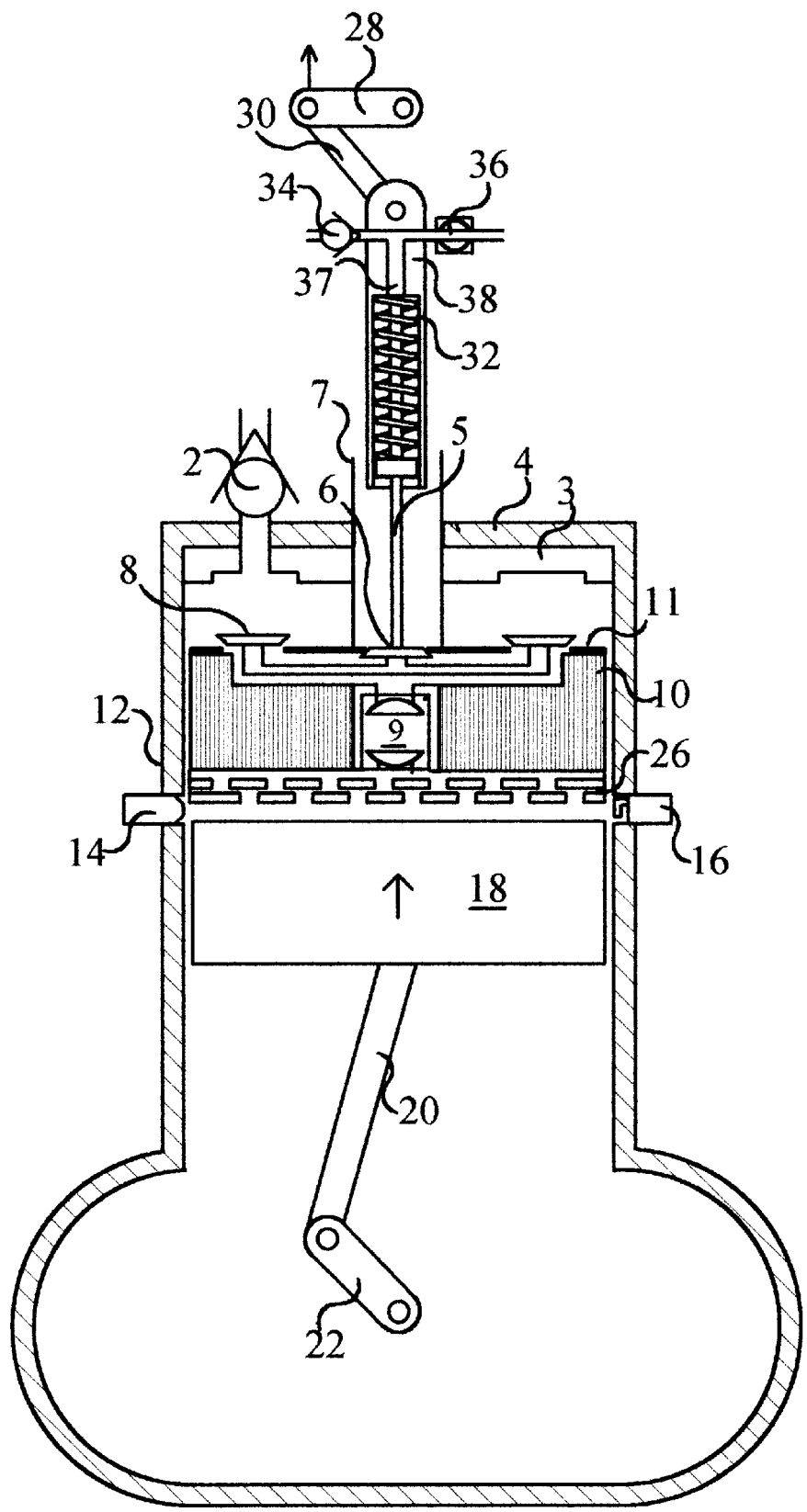

When upper crankshaft 28 reaches about 90° actuator 5, acting as a piston, reaches the top of pneumatic cylinder 37 in motion control shaft 38, as shown in FIG. 7b, and will urge displacer 11 down thereby opening exhaust valve 6 and closing displacer valves 8 as shown in FIG. 1. While displacer 11 is moving down exhaust gases are moving through movable regenerator 10, heating up movable regenerator 10 on their way out exhaust pipe 7. Also while displacer 11 is moving down displacer valves 8 are closed by the force of actuator 5 on them. Displacer 11 becomes like a plunger and sucks in fresh working fluid through air inlet valve 2. Power piston 18 will continue down to the bottom of cylinder 12 and will come up again to about 15% of upward travel (225°), as shown in FIG. 2 for "maximum power" or FIG. 3 for "maximum expansion"; (the condition of motion control shaft 38 for "maximum power" is shown in FIG. 7c, the condition of motion control shaft 38 for "maximum expansion" is shown in FIG. 7d). Actuator 5 will continue to move displacer 11 down until it is about to meet power piston 18 moving up, then actuator 5 will start to move displacer 11 up.

For operation at "maximum power": At the start of action in FIG. 2, there is a maximum charge of fresh air between cylinder head 4 and displacer 11. When motion control shaft 38 starts to move displacer 11 up, actuator 5 urges exhaust valve 6 to close and displacer valves 8 to open. Displacer 11 and power piston 18 move up nearly together. Power piston 18 moving up causes the fresh charge to compress, and this causes air inlet valve 2 to close. Since displacer valves 8 are open, the compressed air moves through movable regenerator 10 and the air is heated from the heat left by the exhaust gases.

For operation at "maximum expansion" of the charge: At the start of action in FIG. 3, there is less of a charge of fresh air between cylinder head 4 and displacer 11. When motion control shaft 38 starts to move displacer 11 up, actuator 5 urges exhaust valve 6 to close and displacer valves 8 to open. Displacer 11 and power piston 18 move up nearly together. Power piston 18 moving up causes the fresh charge to compress, and this causes air inlet valve 2 to close. Since displacer valves 8 are open, the compressed air moves through movable regenerator 10 and the air is heated from the heat left by the exhaust gases.

Figure 4:
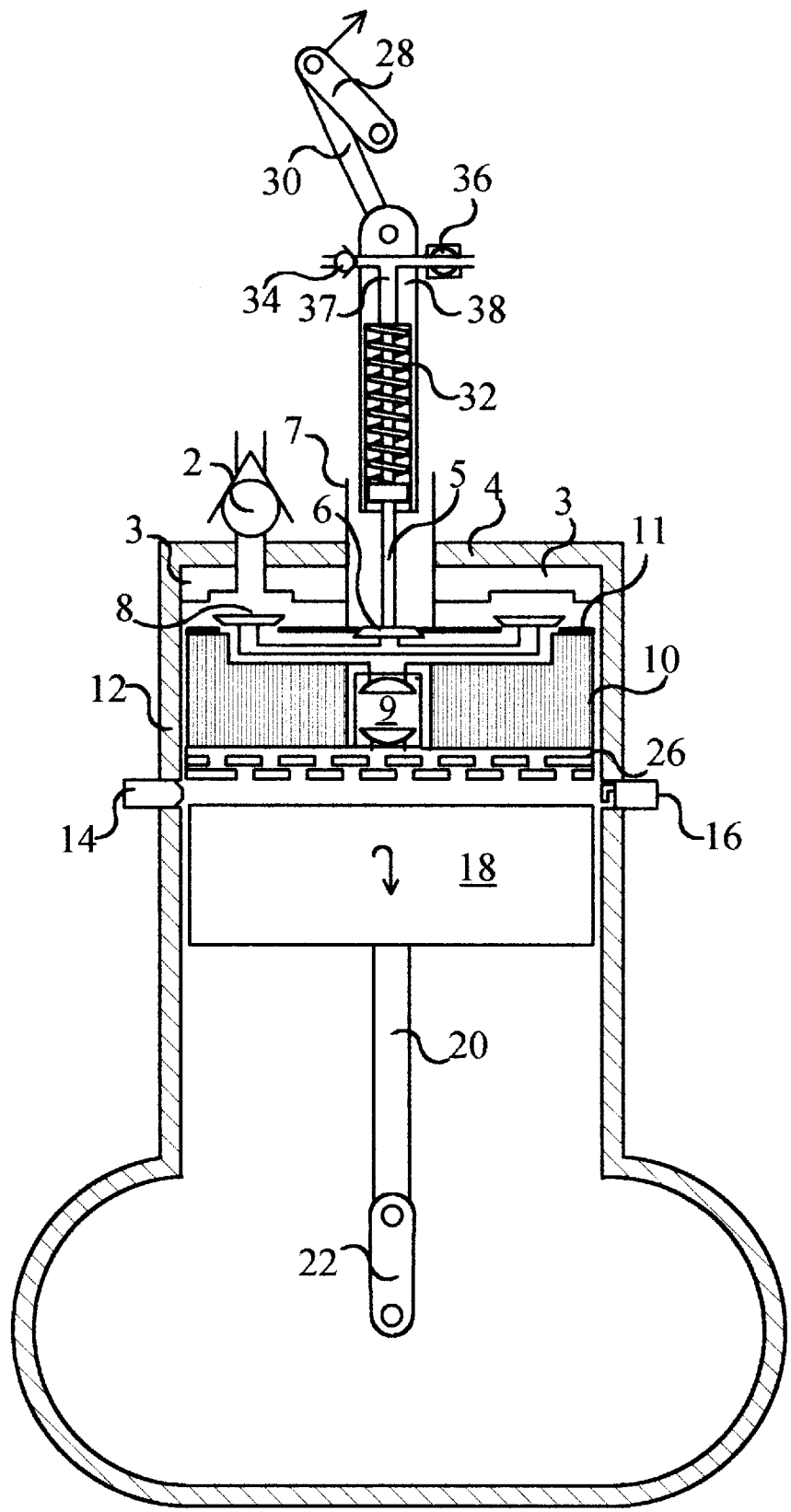

Power piston 18 finishes the compression part of the cycle when it reaches top dead center of its travel (0°). At top dead center (0°) power piston 18 starts the expansion part of the cycle, and moves downwards as shown in FIG. 4. Displacer 11 continues to move up. Since displacer valves 8 are open, the compressed air continues to move through movable regenerator 10 and the air continues to be heated from the heat left by the exhaust gases.

Figure 5:
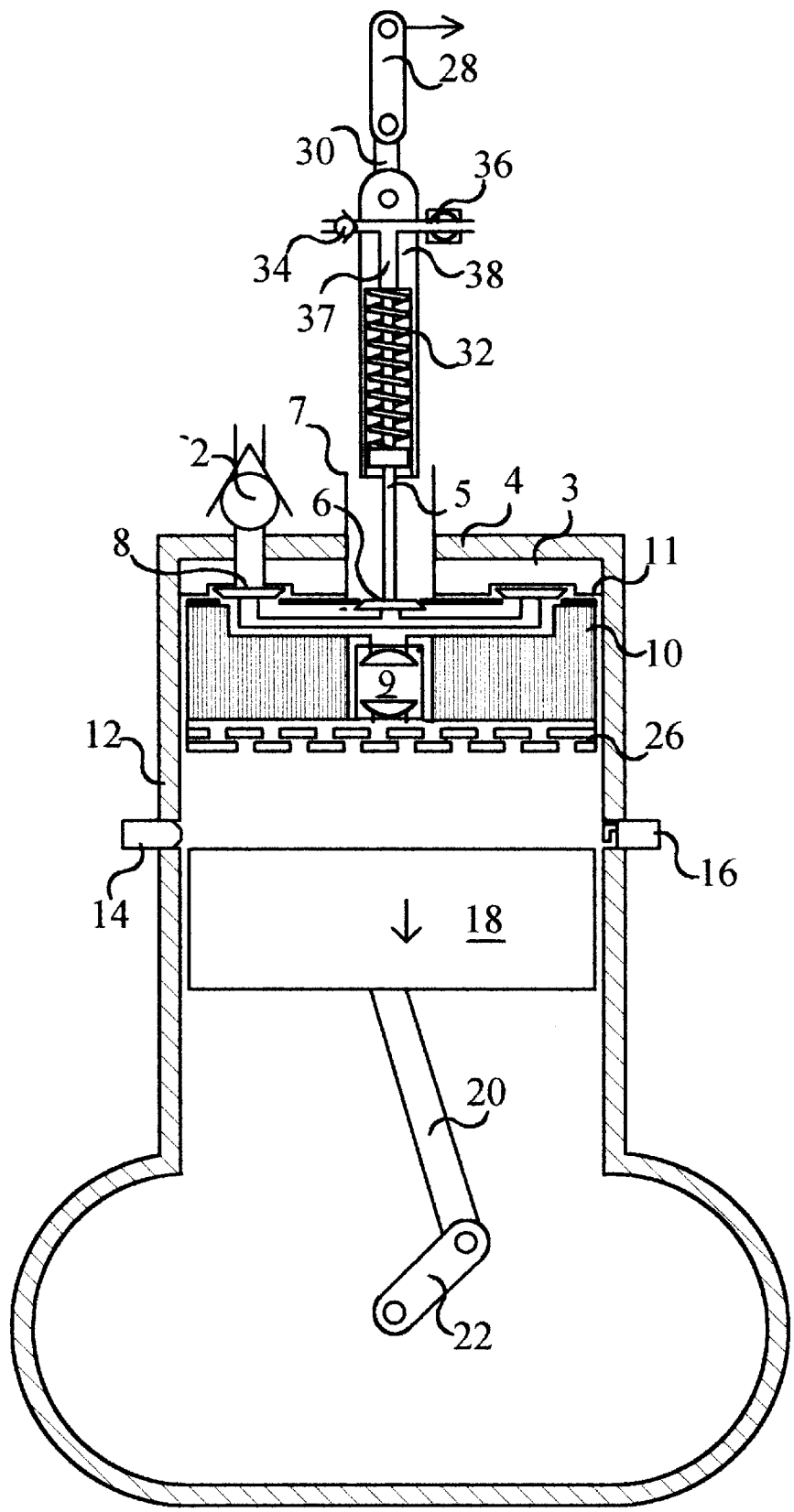

Displacer 11 reaches the top of its stroke about the same time as power piston 18 reaches about 15% of downward travel (45°). While displacer 11 is at the top of its travel exhaust valve 6 is held closed by the expanding hot gases (as shown in FIG. 5). When displacer 11 reaches the top of its stroke the pressure on exhaust valve 6 from the expanding charge keeps it there until power piston 18 reaches about 85% of downward travel (135°). When power piston 18 reaches about 85% of downward travel (135°), actuator 5 reaches the top of pneumatic cylinder 37 in motion control shaft 38 (as shown in FIG. 7b), and will urge actuator 5 down thereby opening exhaust valve 6, closing displacer valves 8, and moving displacer 11 down as shown in FIG. 1. The operation repeats.

FIGS. 10–13 Operation of a Third Alternate Embodiment

A third alternate embodiment of the invention is shown in FIGS. 10–13; (It is the engine of FIG. 1 without movable regenerator 10, thermal shield 26, and regenerator bypass valve 9). FIGS. 10 to 13 present the sequence of steps or processes occurring in a two stroke regenerative engine for a third alternate embodiment of the invention. The air intake and exhaust part of the cycle takes place between FIGS. 10 and 11 for "maximum power" operation of the engine, and between FIGS. 10 and 12 for "maximum expansion of the charge" operation of the engine. The compression part of the cycle takes place between FIGS. 11 and 13 for "maximum power" operation, and between FIGS. 12 and 13 for "maximum expansion" operation. The expansion part of the cycle takes place between FIGS. 13 and 10.

FIG. 10 shows power piston 18 at about 85% of downward travel (135°). The engine has completed its expansion part of the cycle and is about to start the intake and exhaust part. When upper crankshaft 28 reaches about 135° actuator 5, acting as a piston, reaches the top of pneumatic cylinder 37 in motion control shaft 38, and will urge displacer 11 down thereby opening exhaust valve 6 and closing displacer valves 8 as shown in FIG. 10. While displacer 11 is moving down displacer valves 8 are closed by the force of actuator 5 on them. Displacer 11 becomes like a plunger and sucks in fresh working fluid through air inlet valve 2. Power piston 18 will continue down to the bottom of cylinder 12 and will come up again to about 15% of upward travel (225°), as shown in FIG. 11 for "maximum power", or FIG. 12 for "maximum expansion". Actuator 5 will continue to move displacer 11 down until it is about to meet power piston 18 moving up, then actuator 5 will start to move displacer 11 up.

For operation at "maximum power": At the start of action in FIG. 11, there is a maximum charge of fresh air between cylinder head 4 and displacer 11. When motion control shaft 38 starts to move displacer 11 up, actuator 5 urges exhaust valve 6 to close and displacer valves 8 to open. Displacer 11 and power piston 18 move up nearly together. Power piston 18 moving up causes the fresh charge to compress, and this causes air inlet valve 2 to close.

For operation at "maximum expansion" of the charge: At the start of action in FIG. 12, there is less of a charge of fresh air between cylinder head 4 and displacer 11. When motion control shaft 38 starts to move displacer 11 up, actuator 5 urges exhaust valve 6 to close and displacer valves 8 to open. Displacer 11 and power piston 18 move up nearly together. Power piston 18 moving up causes the fresh charge to compress, and this causes air inlet valve 2 to close.

Power piston 18 finishes the compression part of the cycle when it reaches top dead center of its travel (0°). At top dead center (0°) power piston 18 starts the expansion part of the cycle, and moves downwards as shown in FIG. 13. Displacer 11 reaches the top of its stroke about the same time as power piston 18 reaches the top of its stroke. While displacer 11 is at the top of its travel exhaust valve 6 is held closed by the expanding hot gases. This is shown in FIG. 13. When displacer 11 reaches the top of its stroke the pressure on exhaust valve 6 from the expanding charge keeps it there until power piston 18 reaches about 85% of downward travel (135°). When power piston 18 reaches about 85% of downward travel (135°), actuator 5 reaches the top of pneumatic cylinder 37 in motion control shaft 38, and will urge actuator 5 down thereby opening exhaust valve 6, closing displacer valves 8, and moving displacer 11 down as shown in FIG. 10. The operation repeats.

FIG. 14–16—Operation of a Fourth Alternate Embodiment

FIGS. 14 to 16, present the sequence of steps or processes occurring in a two stroke regenerative engine for a fourth alternate embodiment of the invention. The air intake and exhaust part of the cycle takes place between FIGS. 14 and 15 for operation of the engine. The compression part of the cycle takes place between FIGS. 15 and 16. The expansion part of the cycle takes place between FIGS. 16 and 14.

FIG. 14 shows power piston 18 at about 85% of downward travel (135°). The engine has completed its expansion part of the cycle and is about start the intake and exhaust part. When power piston 18 at about 85% of downward travel (135°) exhaust port 40 is uncovered and exhausting begins. When upper crankshaft 28 reaches about 135°, actuator 5 reaches the top of the hole in motion control shaft 38, and will urge displacer 11 down as shown in FIG. 14. While displacer 11 is moving down exhaust gases are moving out exhaust pipe 7. Also while displacer 11 is moving down displacer valves 8 are closed by the flow force on them. Displacer 11 becomes like a plunger and sucks in fresh working fluid through air inlet valve 2 and pushes exhaust gases out exhaust port 40. Power piston 18 will continue down to the bottom of cylinder 12 and will come up again to about 15% of upward travel (225°), as shown in FIG. 15. When power piston 18 reaches about 15% of upward travel (225°) exhaust port 40 will again become covered. Actuator 5 will continue to move displacer 11 down until it is about to meet power piston 18 moving up, then actuator 5 will start to move displacer 11 up.

At the start of action in FIG. 15, there is a charge of fresh air between cylinder head 4 and displacer 11. When actuator 5 starts to move displacer 11 up, displacer valves 8 open. Displacer 11 and power piston 18 move up nearly together. Power piston 18 moving up causes the fresh charge to compress, and this causes air inlet valve 2 to close.

Power piston 18 finishes the compression part of the cycle when it reaches top dead center of its travel (0°). At top dead center (0°) power piston 18 starts the expansion part of the cycle, and moves downwards as shown in FIG. 16. Displacer 11 reaches the top of its stroke about the same time as power piston 18 reaches the top of its stroke. This is shown in FIG. 16. When displacer 11 reaches the top of its stroke the pressure from the expanding charge keeps it there until power piston 18 reaches about 85% of downward travel (135°). When power piston 18 is at about 85% of downward travel (135°) exhaust port 40 is uncovered and exhausting begins. When upper crankshaft 28 reaches about 135°, actuator 5 reaches the top of the hole in motion control shaft 38, and will urge displacer 11 down as shown in FIG. 14. The operation repeats.

CONCLUSION

Accordingly, the reader will see that the two stroke regenerative engine meets the following objects and advantages:

(a) The engine compresses the air in cylinder 12, and the engine expands the charge in cylinder 12.

(b) The engine compresses most of the air in a portion of the cylinder above displacer 11 that is not heated by the hot gases.

(c) The compressed air is cooled by cooler 3.

(d) Movable regenerator 10 saves the heat from the exhaust gases and releases the heat to the compressed air.

(e) All of the engines valves operate at compressed air temperature or slightly higher.

(f) Displacer 11 pushes out most of the exhaust gases each stroke.

(g) With motion control valve 36 almost closed the engine will operate so that the charge is almost fully expanded.

(h) Regenerator bypass valve 9 bypasses the working fluid around movable regenerator 10 at high operating speeds.

Although the description above contains many specificities, these should not be construed as limiting the scope of the invention but as merely providing illustrations of some of the presently preferred embodiments of this invention. For example, in the engine of FIGS. 1–5, the upper crankshaft could be 20° out of phase with the power output shaft instead of 45°.

Thus the scope of the invention should be determined by the appended claims and their legal equivalents, rather than by the examples given.

I claim:

1. A two stroke, internal combustion, reciprocating engine having a number of similar working units, each working unit comprising:
   a) a cylinder, closed at one end by a cylinder head and containing a movable power piston which moves in a reciprocating manner and is connected to a power output shaft;
   b) a displacer located within said cylinder and between said power piston and said cylinder head, said displacer can be moved between said power piston and said cylinder head;
   c) one way flow means located on said displacer to prevent flow through said displacer when said displacer moves towards said power piston, and allow flow through said displacer when said displacer moves towards said cylinder head;
   d) exhaust means located on said displacer to permit the flow of exhaust fluid from said cylinder when said displacer moves towards said power piston, and prevent the flow of exhaust fluid from said cylinder when said displacer moves toward said cylinder head;
   e) intake means for permitting the flow of fresh working fluid into said cylinder during the time during each operating cycle that said displacer moves toward said power piston;
   f) an actuator means for both operating said exhaust means and moving said displacer during predetermined times during the engine's operating cycle;
   g) a linkage means for supplying power from said power piston to the actuator means; and
   h) a heat input means for increasing the molecular activity of the compressed gases.

2. An engine as recited in claim I wherein said linkage means contains a motion control shaft, a spring, and said actuator means.

3. An engine as recited in claim 1 wherein said linkage means contains a motion control shaft with a pneumatic cylinder, a check valve, a fixed orifice, a spring, and said actuator means.

4. An engine as recited in claim 1 wherein said linkage means contains a motion control shaft with a pneumatic cylinder, a check valve, a variable orifice, a spring, and said actuator means.

5. An engine as recited in claim 1 wherein said linkage means allows said displacer to remain at the top of said cylinder until expansion is almost complete.

6. An engine as recited in claim 1 wherein said linkage means varies the length of time of the stroke of the displacer; thereby varying the amount of air compressed.

7. An engine as recited in claim 1 wherein said heat input means is a fuel injector and igniter.

8. An engine as recited in claim 1 wherein said heat input means is a fuel injector and catalytic burner.

9. An engine as recited in claim 1 wherein said actuator means also opens and closes said one way flow means located on said displacer.

10. An engine as recited in claim 1 wherein said one way flow means is actuated by pressure difference from the top side of said displacer to the bottom side of said displacer.

11. An engine as recited in claim 1 wherein said cylinder head contains a cooling means.

12. An engine as recited in claim 1 wherein said displacer contains a thermal regenerator, said regenerator being an alternating flow heat exchanger which moves with said displacer between said cylinder head and said power piston, and stores heat from exhaust gases as it moves towards said power piston, and releases heat to the compressed charge as said regenerator moves away from said power piston.

13. An engine as recited in claim 12 wherein said displacer contains a flow bypass means that causes the working fluid to flow around as well as through the regenerator.

14. An engine as recited in claim 12 wherein said displacer contains a thermal shield to protect said regenerator from the maximum heat of the cycle.

15. A process for operating the engine of claim 1 having the following steps:
   a) when said power piston is near the end of its expansion stroke, said actuator means opens said exhaust means, and starts the downward movement of said displacer, said one way flow means closes, exhaust gases are expelled from said cylinder, and in the same stroke said intake means opens and fresh working fluid is introduced into the cylinder;
   b) said power piston moves through its bottom dead center position and starts back up, while said displacer continues its downward exhaust and intake stroke;
   c) said displacer reverses to an upward movement, said one way flow means opens, said exhaust means closes, said intake means closes, thereby ending said exhaust and intake stroke;
   d) said power piston and said displacer move up toward said cylinder head, thereby performing a compression stroke whereby the working fluid trapped in said cylinder is compressed;
   e) said displacer moves away from its position adjacent to said power piston and moves toward said cylinder head as said power piston approaches top dead center position near the conclusion of compression stroke;
   f) the space between said moving displacer and said power piston is heated as said power piston completes its compression stroke and begins to move away from said cylinder head in said power piston's expansion stroke;
   g) said displacer moves to the top of said cylinder adjacent to said cylinder head and remains there while said power piston continues its expansion stroke, and the cycle repeats.

16. An engine as recited in claim 1 wherein said engine operates with a supercharger.

17. A two stroke, internal combustion, reciprocating engine having a number of similar working units comprising:
   a) a cylinder, closed at one end by a cylinder head and containing a movable power piston which moves in a reciprocating manner and is connected to a power output shaft;

b) a displacer located within said cylinder and between said power piston and said cylinder head, said displacer can be moved between said power piston and said cylinder head;

c) one way flow means located on said displacer to prevent flow through the displacer when said displacer moves towards said power piston, and allow flow through said displacer when said displacer moves towards said cylinder head;

d) an exhaust means for permitting the flow of fresh working fluid out of said cylinder during the time during each operating cycle that said displacer moves toward said power piston;

e) intake means for permitting the flow of fresh working fluid into of said cylinder during the time during each operating cycle that said displacer moves toward said power piston;

f) an actuator means for moving said displacer during predetermined times during the engine's operating cycle;

g) a linkage means for supplying power from said power piston to the actuator means that contains a motion control shaft, a spring, and said actuator means; and allows said displacer to remain at the top of said cylinder until expansion is almost complete;

g) a means for introducing fuel into said cylinder; and h) a means for igniting said fuel.

18. A process for operating the engine of claim 17 having the following steps:

a) when said power piston is near the end of its expansion stroke, said actuator means starts the downward movement of said displacer, said one way flow means closes, said exhaust means opens, and exhaust gases are expelled from said cylinder, and in the same stroke said intake means opens and fresh working fluid is introduced into the cylinder;

b) said power piston moves through its bottom dead center position and starts back up, while said displacer continues its said downward exhaust and intake stroke;

c) said displacer reverses to an upward movement, said one way flow means opens, said exhaust means closes, said intake means closes, thereby ending said exhaust and intake stroke;

d) said power piston and said displacer move up toward said cylinder head, thereby performing a compression stroke whereby the working fluid trapped in said cylinder is compressed;

e) fuel is injected into the space between said moving displacer and said power piston and ignited as said power piston completes its compression stroke and begins to move away from said cylinder head in said power piston's expansion stroke;

f) said displacer remains at the top of said cylinder adjacent to said cylinder head while said power piston continues its expansion stroke; and the cycle repeats.

19. An engine as recited in claim 17 wherein the cylinder head contains a cooling means.

20. An engine as recited in claim 17 operating with a supercharger.

\* \* \* \* \*